Figure 1:
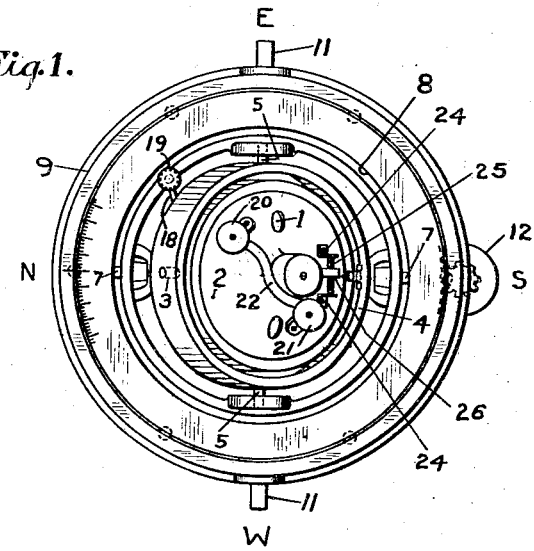

June 24, 1930.    H. L. TANNER    1,765,548

DAMPING GYROSCOPIC COMPASSES

Filed April 25, 1925

INVENTOR.
Harry L. Tanner
BY
ATTORNEYS.

Patented June 24, 1930

1,765,548

UNITED STATES PATENT OFFICE

HARRY L. TANNER, OF BROOKLYN, NEW YORK, ASSIGNOR TO FORD INSTRUMENT COMPANY, INC., OF LONG ISLAND CITY, NEW YORK, A CORPORATION OF NEW YORK

DAMPING GYROSCOPIC COMPASSES

Application filed April 25, 1925. Serial No. 25,894.

This invention relates to damping the oscillations about the meridian of the gyroscopic element of a gyroscopic compass and more particularly to damping means adapted for use with a gyroscopic compass of the type disclosed in my United States Letters Patent No. 1,701,283, granted February 5, 1929.

The advantageous form of gyroscopic compass disclosed in my said application is so constructed that the degrees of freedom of its gyroscopic element about two mutually perpendicular supporting axes may be suppressed in order to cause the element to follow the movement of the craft over the surface of the earth and maintain its normal relation to this surface independently of latitude. By virtue of this construction the effect upon the element of acceleration and retardation pressure due to changes in speed of the craft will be automatically taken care of, and such corrections as may be necessary to meet new conditions of speed may be easily applied.

As illustrated in said application, the gyroscopic compass comprises a mass, such as the rotor of an electrically driven gyroscope, which is arranged to spin about an axis having a large and substantially constant inclination to the surface of the earth and normally bearing a fixed relation to the plane of the meridian; and a surrounding case which serves as a support for the mass and may turn in the plane of the mass about the inclined axis of the latter independently of the rotary movement of the mass within the case.

The case is mounted within an inner supporting member upon an axis lying in the plane of the case; and the inner supporting member is mounted upon a horizontal axis perpendicular to the supporting axis of the case within another supporting member which in turn is mounted upon a horizontal axis within a horizontal inner frame, or the inner supporting member may in some cases be mounted directly upon the frame upon a horizontal axis perpendicular to the supporting axis of the case. Such inner frame is movably mounted upon an outer frame which has a fixed relation to the craft upon which the compass is carried.

When the gyroscopic element occupies its normal position with respect to the points of the compass, that is, when it has settled upon the meridian, relative movement between the frames due to changes in course of the craft will tend to turn the case about the rotor and displace the parts of the contact mechanism with respect to each other. This will cause the driving motor to turn the inner frame and the case in a direction opposite to that in which these members will tend to be turned by the movement of the craft and this reverse movement will continue until the parts of the contact mechanism are brought back to their normal relation thereby stopping the motor.

It is an object of this invention to provide oscillation damping means especially adapted for use with gyroscopic compasses of the type referred to.

A further object is to provide an improved method of damping the oscillations of gyroscopic compasses especially such as disclosed in said Patent 1,701,283.

According to one form of the invention use is made of liquid containing reservoirs mounted on the element at opposite sides of the north-south plane through the center of the apparatus and at opposite sides of the east-west plane through the center of the apparatus, and a reservoir connecting pipe or tube of such interior dimensions that, in view of the slow oscillations of the gyroscopic element, the flow through the tube will be substantially unrestricted.

According to another form of the invention, the liquid is contained in a tube arranged in the same general manner as the first mentioned liquid containing device but the tube is of substantially uniform cross section throughout its entire length.

Figure 2:
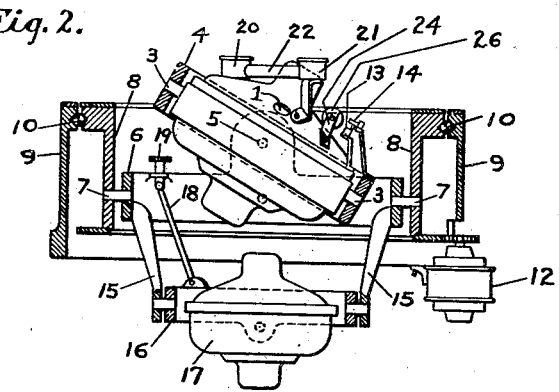
Figure 3:
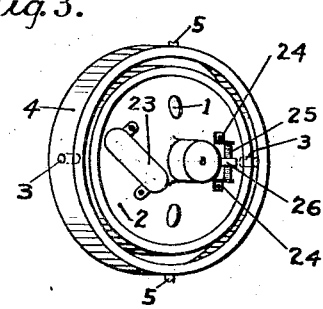

The particular nature of the invention as well as other objects and advantages thereof will appear more clearly from a description of the apparatus shown in the accompanying drawings in which Fig. 1 is a plan view, with parts omitted for the sake of clearness, of a simple form of compass provided with a preferred form of the invention and showing the relation of the parts of the compass when the craft upon which it is mounted is heading north, Fig. 2 is a simplified elevation partly in section of the instrument of Fig. 1 viewed from the west, and Fig. 3 is a simplified plan of a gyroscopic element having another embodiment of the invention applied thereto.

Referring to Figs. 1 and 2, the instrument comprises a gyroscopic rotor 1 of any suitable construction, the axis of which is mounted in upper and lower bearings of a case 2 surrounding the rotor. The case 2 is provided with trunnions 3, 3 mounted in bearings in an inner ring 4 provided in turn with trunnions 5, 5 mounted in bearings in a second ring 6, hereinafter referred to as the stabilized ring of the instrument. The gyroscopic element and its supporting ring 4 are mounted in an inclined position as shown most clearly in the elevational view, Fig. 2, by displacing the axis 5—5 from the center of gravity of the element so that the element is pendulous and maintains a certain inclination to the surface of the earth when the rotor is not spinning. This angle will be constant for all positions of the compass.

When the rotor is spinning the inclination of the element will differ from its inclination when the rotor is at rest by a second angle which depends upon the latitude and a third angle which depends upon the east-west component of the speed of the craft upon which the compass is carried.

The stabilized ring 6 is provided with trunnions 7, 7 disposed at right angles to the trunnion axis 5—5 and in the plane of the trunnion axis 3—3. The trunnions 7, 7 are mounted in bearings in an inner frame or shell 8 adapted to be power driven and bearing a scale graduated in units of angular measure. This frame 8 is rotatably mounted within an outer frame or shell 9 as by means of balls 10. The frame 9 bears the lubber's line of the compass and is provided with trunnions 11, 11 adapted to fit in bearings in the gimbal rings of the binnacle, which have been omitted from the drawing for the sake of simplicity.

The element 8 is adapted to be driven by a servo motor 12 in any suitable manner, as by means of a pinion meshing with a gear attached to the element. The circuit of the servo motor is controlled by a device consisting of a contact 13 mounted on the case and adapted to engage one or the other of two contacts 14 mounted upon the ring 4 to cause the servo motor to rotate in one direction or the other. For simplicity the circuit connections between the device and the motor have been omitted.

The stabilized ring 6 is provided with a pair of depending brackets 15 disposed in the north-south plane and carrying at their lower ends a ring 16 within which is mounted a stabilizing gyroscope 17 having its rotor axis substantially vertical. Connected with the ring 16 is a member 18 which at its other end is attached to an adjusting device 19 mounted on the stabilized ring 6, whereby the planes of the rings may be adjusted relatively to each other.

In considering the operation of the instrument described above it will be assumed that the rotor 1 of the main gyroscope is turning clockwise as viewed from above in Fig. 1. It will also be assumed that the contact 13 occupies its neutral position with respect to the two cooperating contacts 14 so that the servo motor 12 is not energized. It will be most convenient to regard the element 8 as having been turned in a clockwise direction through 90° from the position shown in Fig. 1 so that the axes 3—3 and 7—7 be in an east-west direction with the high side of the gyroscopic element toward the east.

In accordance with the principle of the gyroscope the plane of rotation of the rotor 1 will remain fixed in space. As the earth turns from under the rotor due to its rotation, the high side of the rotor will rise relatively to the surface of the earth carrying the case with it. This will cause the pendulous mass of the rotor and case to be shifted from its position of equilibrium, or, in other words, the center of gravity of the gyroscopic element may be regarded as having been displaced toward the east from its normal position. This displacement will produce a torque about the horizontal supporting axis 5—5 which will cause the rotor and case to precess about the inclined axis 3—3, thus displacing their plane with respect to the plane of the inclined ring 4. Under the conditions assumed herein, the north side of the case will move up and the south side will move down, so that the contact 13 will be shifted from its neutral position with respect to the contacts 14 into engagement only with the contact lying toward the south, thereby energizing the servo motor 12 to rotate in a direction to turn the power driven element 8 counter-clockwise to carry the axes 3—3 and 7—7 toward the meridian. As the movable parts of the instrument turn toward the meridian the inclination of the gyroscopic element will gradually increase as the earth continues to turn away from under it, thus increasing the torque about the axis 5—5. The rotor and case will therefore precess about the axis 3—3 at an increasing rate, and the contacts 13 and 14 will keep the servo motor 12 energized and the element 8 in motion. The axes 3—3 and 7—7 will thus be carried past the meridian and toward the west. This westerly movement will continue until the contact 13 again assumes its neutral position with respect to the contacts 14 to deenergize the servo motor 12. This will not occur until precession about the axis 3—3 has ceased due to the absence of torque about the axis 5—5. This last named condition will obtain when the parts of the instrument have turned so far toward the west that the gyroscopic element lies at its normal inclination with respect to the surface of the earth due to the fact that in the new position of the element the earth is turning toward the plane of the rotor instead of away from it as at the beginning of the cycle of operations described above.

During the movement of the parts from east to west there will be a relative movement of the case with respect to the rotor about the axis of the latter entirely apart from the rotation of the rotor within the case. In other words, during meridian seeking oscillations, the case 2 will turn in the plane of the rotor about the axis common to it and the rotor, while the rotor is spinning about this same axis. At the same time that the case is turning about the rotor axis it is also precessing about its trunnion axis 3—3. The resultant movement of the case due to the movement imparted to it by the servo motor and that due to precession will be about a vertical axis passing through the intersection of the axes 3—3 and 5—5.

After the gyroscopic element has reached the western limit of its oscillation, the movement of the earth toward it will result in a depression of its high side relatively to the surface of the earth due to the fixity of the plane of rotation of the rotor. This depression of the high side of the element will result in shifting its center of gravity, toward the east from its normal position, thus producing about the horizontal axis 5—5 a torque which will be in the opposite direction to that produced when the element was at its eastern limit of oscillation. This torque will cause precession of the rotor and case about the axis 3—3 in such a direction as to elevate the north side of the case and depress the south side relatively to the inclined ring 4. As a result of this precession the contact 13 will be shifted from its neutral position with respect to the contacts 14 into engagement only with the one lying toward the south, thus energizing the servo motor 12 to turn the power driven element 8 in a clockwise direction thereby swinging the axes 3—3 and 7—7 across the meridian toward the east. As the parts move from the west toward the meridian the inclination of the gyroscopic element with respect to the surface of the earth will continue to decrease since the earth is turning toward the element. The torque about the axis 5—5 due to the shifting of the center of gravity of the element will thus be increased, as will also the precession of the rotor and case about the axis 3—3. The instrument will cross the meridian from west to east with the axis 3—3 depressed as far below its normal inclination as it was raised above this inclination when it crossed the meridian from east to west.

During the west to east movement the case will turn about the rotor axis in the opposite direction to that in which it turns during the movement from east to west, and the case will also have a movement of precession about the axis 3—3 in the opposite direction. The resultant movement of the case will be about a vertical axis through the intersection of the axes 3—3 and 5—5 but in the opposite direction to that in which it turned during the east to west oscillation.

If the gyroscopic element be unaffected by any other external forces its oscillations will gradually diminish in amplitude due to friction, and it will ultimately reach a settling point with its axis 3—3 lying in the plane of the meridian and at a definite angle which is the resultant of combining the angle of inclination when the rotor is at rest; an angular variation from such inclination for the particular latitude of the compass when its rotor is spinning; and an angular variation in accordance with the east-west component of the speed of the craft so that the gyroscopic element may follow the movement of the craft over the earth's surface. The first mentioned angular variation is such that the pendulousness of the element will maintain a torque about the axis 5—5 to cause the element to precess about the axis 3—3 at an angular velocity equal to the component of the angular velocity of the earth about an axis parallel to the axis 3—3, whereby the element follows the movement of the earth about its axis.

If the course of the craft be changed the resulting movement in azimuth of the outer element will tend to carry along the inner shell or element 8 and the rings 6 and 4 mounted thereon. As the ring 4 moves it will turn the case 2 about the inclined axis of the rotor and will itself be slightly tilted about the axis 3—3 from its normal position with respect to the case. There will be therefore a displacement of the contacts 13 and 14 from their neutral positions relative to each other, in a direction to cause the servo motor 12 to turn the element 8 in the reverse direction and consequently turn the ring 4 and case 2 until the contacts 13 and 14 are brought back to their relatively neutral positions. The instrument will operate in this manner whenever there is any yaw of the craft, the servo motor maintaining the compass card in its true position while the element 9 bearing the lubber's line will turn in accordance with the movement of the craft.

A simple form of compass such as has been described above will, however, require such a long time to settle on the meridian that it would be unsuited for use even on land unless means were provided for damping its oscillations. If, on the other hand, the compass be used on ship board, as would be the usual case, the impulses due to rolling of the ship and other causes may be sufficient to cause an instrument of the simple form to oscillate indefinitely so that it would never settle upon the meridian. It is therefore essential that means be provided for damping the oscillations, in order that the instrument may be used for navigational purposes.

According to one form of my invention, as shown in Figs. 1 and 2, use is made of liquid damping device comprising a pair of liquid containing reservoirs 20 and 21 mounted on the upper part of the case at opposite sides of the vertical planes through the axes 3—3 and 5—5, respectively and substantially equidistant from the line of said planes, and a connecting tube 22 of such dimensions that, in view of the comparatively slow movements of the case 2, the flow of the liquid therethrough may for all practical purposes be considered as unrestricted.

The equilibrium position of the gyroscopic element, including the liquid damping means under consideration, is shown in Fig. 2. Assuming that it starts from an east position the inclination of the element will be increased as the earth turns from under it and the liquid will flow from reservoir 20 into reservoir 21. One effect of such increase of weight of the contents of reservoir 21 and decrease of weight of the contents of reservoir 20 is to produce a torque which may be resolved into two components, one about the axis 5—5 and the other about the axis 3—3.

Such component torque about the axis 5—5 reduces the pendulousness of the gyroscopic element slightly and decreases its meridian seeking tendency. The effect of this component may be offset by rendering the case 2 sufficiently pendulous.

The effect of the component torque about the axis 3—3 is to cause precession about the axis 5—5, thus depressing the high side of the gyroscopic element and elevating the lower side. The inclination of the element is therefore reduced below that which would exist in the undamped form of instrument and the amplitude of the oscillation toward the west is therefore reduced. As the element swings back from west to east the damping means will again act to lessen the deviation of the axis from its normal inclination as compared with the undamped instrument. The inclination of the axis thus rapidly approaches its normal value during subsequent oscillations and finally settles in the plane of the meridian.

In carrying out the invention in another way, as shown by Fig. 3, use may be made of a single tube 23 arranged with its ends at opposite sides of the vertical plane through the axis 3—3 but normally at one side of the vertical plane through the axis 5—5. When the inclination of the gyroscopic element is changed more of the liquid will flow to the depressed end to produce a component of torque about the axis 5—5 and a component of torque about the axis 3—3. The torque about the axis 5—5 merely effects the pendulousness of the gyroscopic element and its meridian seeking tendency and may be offset by rendering the case sufficiently pendulous. The effect of the component about the axis 3—3 is to cause precession about the axis 5—5 and a damping action will be produced in the same way as with the damping means comprising reservoirs 20 and 21.

In this form of gyroscope the effect of rolling and pitching is overcome by the stabilizing gyroscope 17, but effects due to changes of latitude and other causes must be compensated and this may be done by means including the adjusting device 19 as more fully described in said Patent 1,701,283.

For the purpose of accurately balancing the main gyroscope about the axis 3—3 the case 2 is provided with a pair of brackets 24 supporting a screw 25 on which is threaded a weight 26, the arrangement being such that by turning the weight about the screw 25 it may be moved in a direction perpendicular to the axis 3—3.

While preferred embodiments of the invention have been shown and described, it should be understood that the invention may be embodied in other forms and that various changes in the details of construction of the elements of the instruments may be made without departing from the principle of the invention as defined in the appended claims.

I claim:

1. In a gyroscopic compass, a rotor, a case within which the rotor is mounted to spin about an axis inclined to the surface of the earth at a substantial angle to the vertical and to the horizontal and normally lying in the plane of the meridian, and means for damping the oscillations of the rotor axis about the meridian comprising two liquid containing reservoirs mounted on the case on opposite sides of the vertical plane through the spinning axis and spaced apart in the direction of that plane, and means forming a connecting passage of such size that in view of the comparatively slow oscillatory movement of the casing the flow of liquid will be substantially unrestricted.

2. In a gyroscopic compass, the combination with a gyroscopic element including a rotor having its axis of rotation inclined to the surface of the earth at a substantial angle to the vertical and to the horizontal and a case therefor, of liquid damping means rigidly mounted on and diagonally across the case with respect to a vertical plane containing the axis of rotation, said means being so constructed that the center of gravity of the contained liquid shifts substantially in phase with the changes in inclination of its gyroscopic element to the surface of the earth.

In testimony whereof I affix my signature.

HARRY L. TANNER.